(12) United States Patent
Garey et al.

(10) Patent No.: US 10,572,705 B2
(45) Date of Patent: Feb. 25, 2020

(54) SECURE AND TRACEABLE SECURITY FEATURES FOR DOCUMENTS

(71) Applicant: United States Postal Service, Washington, DC (US)

(72) Inventors: Ronald E. Garey, Mitchellville, MD (US); Suzanne N. Dunn, Selma, NC (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 16/111,748

(22) Filed: Aug. 24, 2018

(65) Prior Publication Data
US 2019/0065798 A1    Feb. 28, 2019

Related U.S. Application Data

(60) Provisional application No. 62/549,832, filed on Aug. 24, 2017.

(51) Int. Cl.
| | | |
|---|---|---|
| G06K 7/14 | (2006.01) | |
| G06F 16/93 | (2019.01) | |
| G06F 16/245 | (2019.01) | |
| G07D 7/0047 | (2016.01) | |
| G07D 7/005 | (2016.01) | |
| G07D 7/0043 | (2016.01) | |

(52) U.S. Cl.
CPC ......... *G06K 7/1413* (2013.01); *G06F 16/245* (2019.01); *G06F 16/93* (2019.01); *G07D 7/005* (2017.05); *G07D 7/0043* (2017.05); *G07D 7/0047* (2017.05)

(58) Field of Classification Search
CPC .. G06K 7/1413; G06K 7/1417; G06F 16/245; G06F 16/93
USPC ............................ 235/375, 385, 462.42, 468
See application file for complete search history.

(56) References Cited

U.S. PATENT DOCUMENTS

| | | | |
|---|---|---|---|
| 7,963,449 B2* | 6/2011 | Jones | C09J 7/0207 235/375 |
| 8,991,706 B2* | 3/2015 | Green | B42D 25/41 235/458 |
| 2004/0153649 A1* | 8/2004 | Rhoads | G06F 17/241 713/176 |
| 2004/0263335 A1* | 12/2004 | Molnar | G06Q 10/08 340/572.1 |
| 2005/0060171 A1* | 3/2005 | Molnar | G06K 17/0022 340/572.1 |
| 2007/0119951 A1* | 5/2007 | Auslander | G06K 19/06046 235/491 |
| 2013/0043311 A1* | 2/2013 | Green | B42D 25/41 235/458 |
| 2015/0110268 A1* | 4/2015 | Wilkinson | G06K 19/067 380/46 |

* cited by examiner

*Primary Examiner* — Paultep Savusdiphol
(74) *Attorney, Agent, or Firm* — Knobbe Martens Olson & Bear LLP

(57) ABSTRACT

A system for providing document authenticity, securing, and tracing includes a mark, an invisible code and a serial number. A user desiring to create a secure, verifiable document can receive one or more codes or indicia to put on the physical document.

20 Claims, 5 Drawing Sheets

SECURE AND TRACEABLE SECURITY FEATURES FOR DOCUMENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority of U.S. Provisional Application No. 62/549,832, filed Aug. 24, 2017, the entire contents of which are hereby incorporated by reference.

FIELD

This application relates to security features for documents. Specifically, this application relates to security features for physical documents that are secure and traceable.

DETAILED DESCRIPTION

Figure 1:
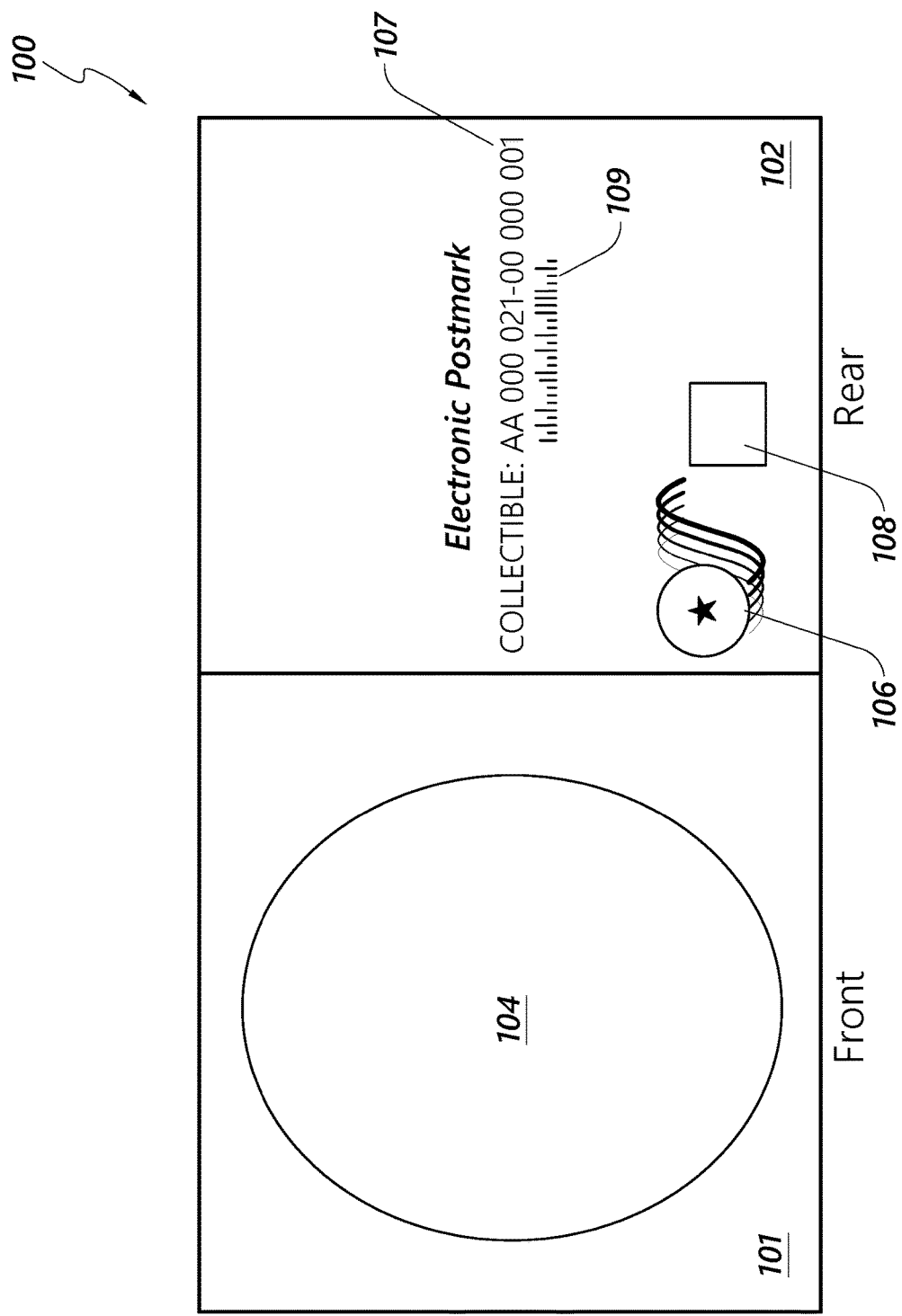
FIG. 1 depicts an embodiment of a document having a unique identifier thereon.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Physical documents can be counterfeited, illegally reproduced, altered, defaced, or stolen. Some documents, such as collectibles, memorabilia, vital records, census records, identification documents, government documents, photographs, and the like, have or derive value in being authentic and traceable. With the rise of imaging and reproduction technology, it is important to know whether a particular document is a valid, unaltered, legitimate document.

In one aspect, the present disclosure describes a system for ensuring documents are legitimate, to identify counterfeiting, and to provide traceability for documents. The data in each created document file is encrypted and digitally stored, and outputted as invisible physical printed matter.

One or more security features can be located on each secure document, which can include an emblem, a unique identifier, and an "invisible" code. The "invisible" code can be a code applied to a document using an "invisible" ink, such as an ink that fluoresces, phosphoresces, illuminates, or otherwise becomes visible upon interrogation with an appropriate signal or by using a specific method, filter, device, etc. The type of ink used to create the "invisible" code can be a singular ink or combination of processes, including but not limited to, ink that may be developed by a chemical reaction process, or any of other processes available. The invisible code can encode an Electronic Postmark®, or EPM™, or an identifier for an EPM™, and can be similar to those described with regard to U.S. application Ser. No. 15/066,945, filed Mar. 10, 2016, the entire contents of which is herein incorporated by reference.

To provide security and to ensure authenticity of a document, such as a collectible, sports card, autograph, vital record, census record, voting ballot, identification document (voter ID, driver license, social security card, or government issued ID, etc.), a government document, a photograph, and the like, the document can have an emblem or mark, a unique identifier, and an invisible code applied to them. The emblem, unique identifier, and/or the invisible code are applied by the originator or creator of the document, or by an entity authorized by the originator or owner of the document. The unique identifier and the invisible code are stored in a memory, such as a secure database. The unique identifier acts as a unique serial number associated with and identifying the specific document on which the unique identifier is located. The invisible code identifies a digital tracking service, such as an EPM™. A party can recognize that the document is protected or tracked for authenticity by seeing the emblem on the document. The emblem can be an indicator that the document is protected or validated using systems described herein. In some embodiments, the emblem can include the unique identifier or an encoded identifier. In some embodiments, the emblem can be a computer readable emblem which itself encodes a unique identifier, such as a digital badge or the like.

A user can access information about the document, such as origination date, owner, etc., using the unique identifier. When the document is processed, such as by the United States Postal Service (USPS), or another entity, the invisible code can be read using a specialized reader which can interrogate and read the invisible code, for example, using a barcode reader as installed in USPS post offices, or those authorized by the US Postal Inspection Service. The USPS can also read the unique identifier. The scan of the unique identifier and the invisible code can be recorded in a record associated with the document. Actions, services, and the like that occur in the processing of the document can be stored in the record of the document which is associated with the invisible code and the unique identifier. In this way, a document can be securely identified as authentic, securely tracked, and any alterations or counterfeiting identified. Document processing can be performed on document processing equipment. Document processing equipment can include main processing equipment such as sorting or other similar equipment; imaging equipment and associated equipment; computer systems and scanners at retail locations such as stores, post offices, and the like; mobile computing devices; and any other suitable equipment for processing, reading, evaluating, or otherwise handling a document.

As used herein, the phrase "invisible code" can be understood to mean a code, such as a number, an alphanumeric string, or a computer readable code which is not normally visible to the human eye. The invisible code can be read when interrogated with a proper signal, such as when a particular wavelength of light is shined on the invisible code or when the invisible code is interrogated with electromagnetic radiation having a specific energy, spectrum, wavelength, and the like. Also as used herein, the term "item" can refer to a physical document, a package or parcel, a mailpiece, or to any means of conveyance, such as a trays, containers, crates, boxes, bags, tags, vehicles, and the like. As used herein, the phrase "secure document" can mean a document which has particular features, such as serial numbers, codes, and the like that can be used to verify or confirm authenticity. A secure document can have an electronic record associated therewith which can provide information about the document's creation, ownership, and the like.

FIG. 1 depicts an embodiment of a document having authenticity and traceability features thereon. A document 100 has a front 101 and a back 102. Although the front 101 and back 102 would ordinarily be on opposite sides of the document 100, the front 101 and the back 102 in FIG. 1 are shown side-by-side for convenience. The front 101 includes an image 104. The image 104 can be an image, text, or any other information on the document 100, such as the contents of the vital record, census record, government ID, etc. For example, in the case of a collectible card, such as a sports memorabilia card, the image 104 may be an image of an athlete or player, or of a team of athletes or players. In the example of a vital record, (i.e., government records that could include vital information associated with personal identity such as Social Security, Date of Birth, Place of Birth, Signature, etc.). The image 104 can include the vital information, or in the case of a bank statement, the image 104 can be the bank statement information. The image 104, as described herein, need not be limited to a to an image, but could include one or more images, text, numbers, or any combination of the above. In some embodiments, the image 104 can be on both the front 101 and the back 102. In some embodiments, such as in the case of a vital record, the image 104 begins on the front 101 and continues on the back 102.

The back 102 includes a mark 106, a serial number 107, an invisible code 108 and a computer readable code 109. A person of skill in the art, guided by this disclosure, will understand that the document 100 can include one, all, or any combination of the mark 106, the serial number 107, the invisible code 108, and the computer readable code 109.

The mark 106 is an icon, emblem, pattern, or image that identifies the document 100 as having security and traceability features thereon and/or associated therewith. The mark 106 can signal to an entity, user, owner, or holder of the document 100, that the document 100 employs the security and tracing system described herein. In some embodiments, the mark 106 can include the serial number 107 and/or the computer readable code 109.

The serial number 107 is a unique identifier assigned to, printed on, affixed to, or otherwise placed on the document 100. The serial number 107 is an alphanumeric string, and is human readable. The computer readable code 109 can be an encoded version of the serial number 107, or can be another unique identifier associated with the serial number 107. In some embodiments, the computer readable code 109 can encode information about the document 100, such as, for example, the date of document creation, an identifier for a document originator, a delivery point for a recipient of the document 100, and the like. In some embodiments, the computer readable code can include a 5 to 11 digit ZIP code or other similar code, if mailed outside the United States. In some embodiments, the computer readable code 109 can be an IMb™ code. In some embodiments, the document 100 does not include a computer readable code 109. In some embodiments, the document 100 includes a computer readable code 109 and no serial number 107.

The invisible code 108 can be an image, a computer readable code, such as a barcode, QR code, and the like. The invisible code 108 can encode a unique identifier, which can be distinct from the serial number 107 and the computer readable code 109. In some embodiments, the invisible code 108 can encode an identifier for an EPM™. In some embodiments, the invisible code 108 can encode or include a reference to or an association with the serial number 107 and/or the computer readable code 109. The invisible code 108 is an encrypted code such that if the invisible code 108 is read, it cannot be used to access any document information (as will be described below) unless the reader has the proper decryption capabilities, or access to the decryption keys. In some embodiments, the invisible code 108 can be printed over, within, or underneath the mark 106.

The invisible code 108 can be applied to the document 100 using an ink or printing that is invisible to an un-aided human eye. The invisible code 108 can be read when interrogated with the proper wavelength of light, to induce phosphorescence or luminescence. The induced phosphorescence or luminescence can be a pattern, such as a computer readable code, image, text string, and the like. The interrogation device, such as a scanner at a postal facility, can read the signal and decode, or transmit the signal to another processor for decoding. In some embodiments, the invisible code 108 is printed with a reflective ink that reflects an interrogation signal with a specific wavelength or with a specific pattern, which can be read and interpreted by an interrogation device. The invisible code 108 can comprise an ink which undergoes a stokes shift or an anti-stokes shift when interrogated by particular wavelengths of light, shifting to a visible spectrum emission when interrogated. The invisible code 108 is formulated with an ink that cannot be easily reproduced, such as by photocopying.

Figure 2:
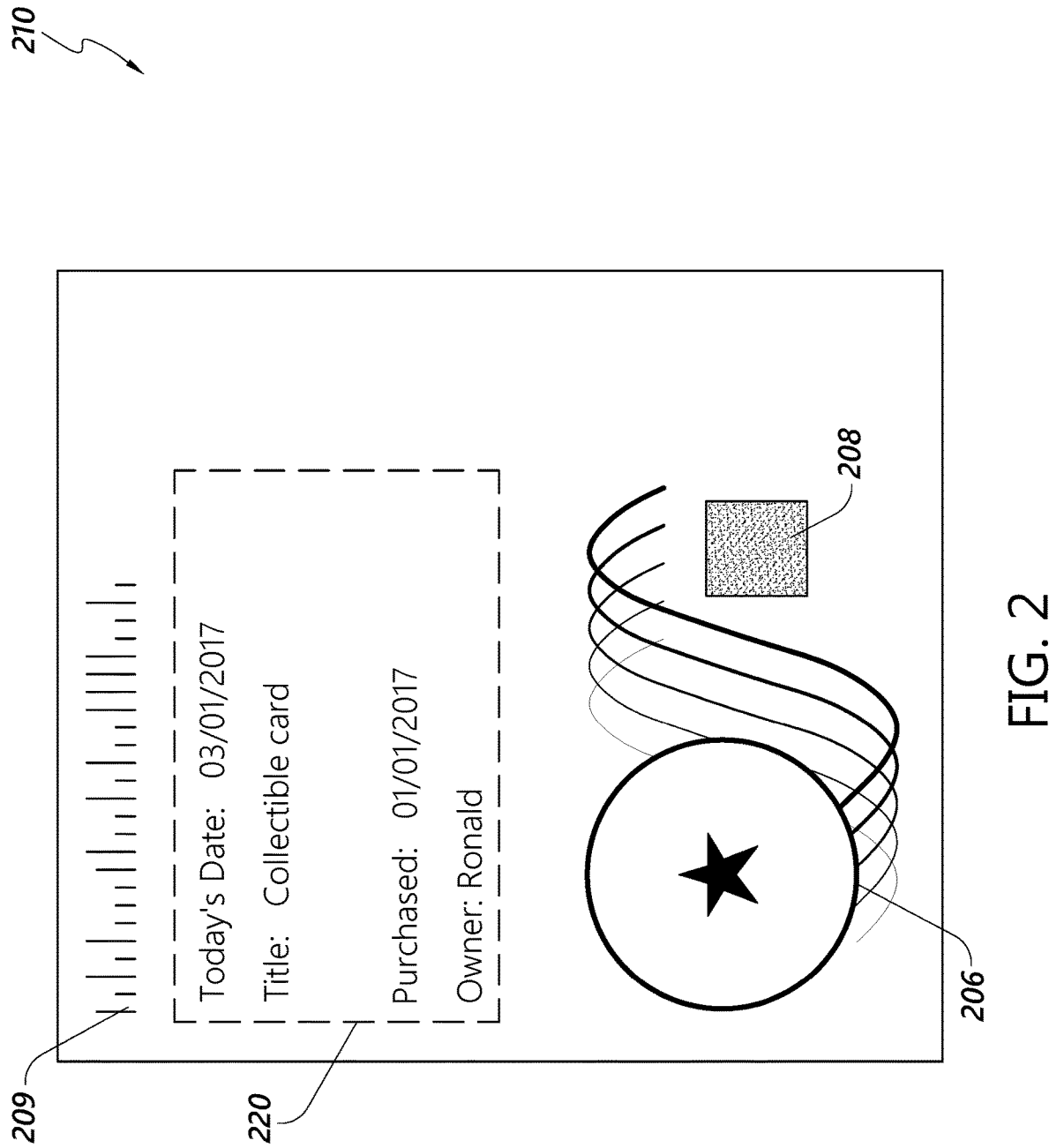
FIG. 2 depicts an embodiment of a display of a user interface.

FIG. 2 depicts an embodiment of a display of a user interface. A display 210 can be used to create, view, confirm, compare, request, edit, or otherwise view or modify information associated with a document 100. The display 210 can be part of a user interface such as a computing device. The computing device can be a desktop or laptop computer, a tablet, a smart phone and the like. FIG. 2 depicts a display of information associated with a document having a mark 206 and an invisible code 208 thereon. For example, the display 210 depicts what a user may see when a user types in a serial number from a document, such as the serial number 107 described above, into a user interface, or scans a computer readable code on the document, such as computer readable code 109. The display will depict the mark 206 as an indicator that the document has a security or traceability feature associated with it. The display 210 also displays a version of the invisible code 208, shown in a visible format on the display 210, such as a QR code. The display 210 also includes a computer readable code 209 and data fields 220.

The computer readable code 209 can correspond to a computer readable code located on the document, as described elsewhere herein. In some embodiments, the computer readable code can also encode or be associated with a delivery point. The delivery point encoded in the computer readable code 209 can be the delivery point of a user who ordered, purchased, requested, or received the document.

The data fields 220 include today's date, which can be the day on which the user accesses the information about the document, a title of the document, a date the document was purchased, and an owner of the document. Although these four data fields 220 are shown here, a person of skill in the art, guided by this disclosure, would understand that the data fields 220 can include more or fewer or different data fields 220 than those depicted here. The types of data fields 200 can also be different for each category of document. FIG. 2 depicts possible data fields 220 for a collectible card, such as a sports card. A vital document or health record can have different information listed in the data fields, (i.e., date of birth, birth place, Social Security Number, race, etc.), such as the intended recipient, the originating entity, or a list of people authorized to view the document.

A user can access and view the data fields 220 on the display in order to verify the authenticity of the document. For example, if the user types in the serial number 107 or scans the computer readable code 109 into a user interface, and the serial number is not recognized, a user can consider the document a fake or forgery. If the serial number 107 or the computer readable code 209 does return information from the database, and the information in the data fields does not match what a user expects, this can indicate that a document has been modified, is stolen, is a fake, etc. For example, if a user is contemplating buying a sports card, the user can check whether the listed owner corresponds to the individual selling the sports card. If these do not match, a user can suspect the document 100 is not authentic, or there is some other problem. A user can also use the data fields 220 to show to a prospective buyer or recipient of the document 100 that the document is authentic, by inputting the serial number 107 into the database, or scanning the computer readable code 109 and showing the prospective buyer or recipient the information. A user may also desire to determine the provenance or title history of a document. The data fields can include the title history or ownership history for a document, or the data fields 220 can include a clickable link (not shown) that can link to the title history or ownership history for the document, can link to the transaction history of a document, or can link to any other desired information about the document.

Figure 3:
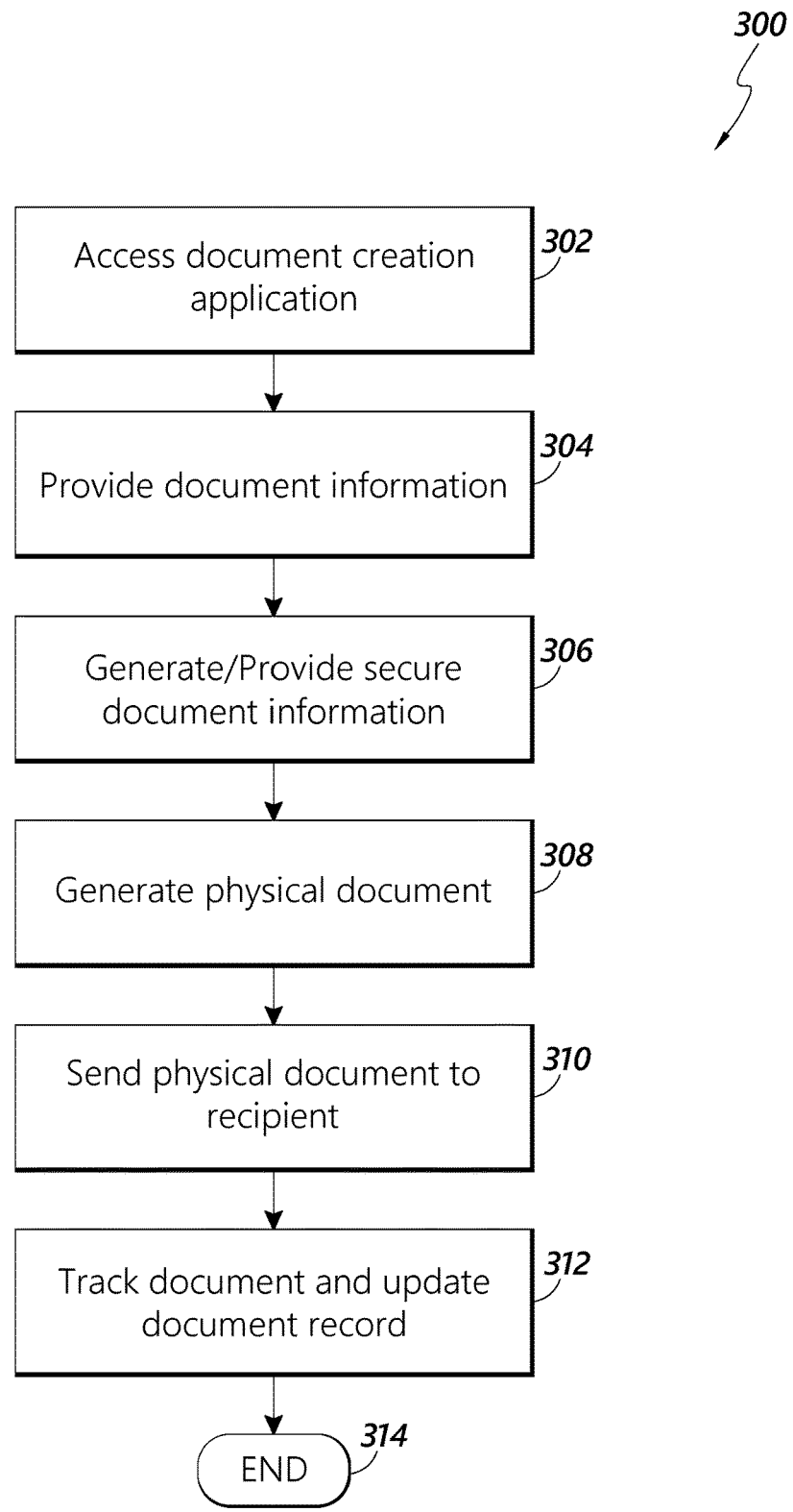
FIG. 3 is a flow chart depicting an embodiment of a process for creating a secure document.

The use, tracking, authentication, and tracing of documents using the features described above will now be described with regard to FIGS. 3-5. FIG. 3 is a flowchart of an exemplary process for creating a card protected by a tracking and tracing system described herein.

The process 300 moves to step 304 upon granting the document originator access to the document creation application. The document originator provides document information, such as the title of the document 100, a request to use the tracking and tracing system, the originator of the document 100, the origination/creation date of the document 100, the owner of the document, the name of the entity or person requesting the document, and the like.

FIG. 3 is a flow chart depicting an embodiment of a process for creating a secure document. The process for creating a secure document can be performed by any entity wishing to create a secure document (requestor). The requestor may also originate or generate the physical document, or the requestor may request that the securing entity originate, or generate the physical document. As a non-limiting example, a sports card manufacturer or a vital records bureau may wish to create secure documents as described herein. The requestor can request and receive information from a securing entity, such as the USPS, and generate the physical document using information received from the securing entity. In some embodiments, the entity wishing to create the secure document can send the document information, including images, text, and the like, to the securing entity to generate the physical document. Having the physical document generated by a securing entity can add an additional level of security to the requesting process.

A process 300 begins in step 302, wherein the requestor accesses a document creation application via a user interface. A securing entity can operate or access the application in order to provide the security features and codes for placing on the physical documents. The user interface can be a mobile application, a web portal, a cloud computing environment, a memory resident program running on a computer, and the like. The requestor can have credentials previously supplied which verify or confirm the requestor has an account, subscription, etc., with the document creation application, or are authorized to request document creation. A requestor accesses the document creation application using a login, a token, or other secure method or credential. The document requester accesses the document creation application using a secure log-in or other secure credentials. The secure log-in ensures that only legitimate document requestors or originators have access to the tracking and tracing system.

The process 300 moves to step 304, wherein the requestor inputs document information, and the document creation application receives document information. In some embodiments, the requestor can provide images or codes corresponding to the entire document which the application can then convert or use for printing a physical copy of the document. For example, a sports card maker can provide the images, text, and all other information for the sports card to the document creation application, and the document creation application will, itself or using an additional processor, print or cause to be printed the physical copy of the document.

In some embodiments, the requestor provides information about the document. In the example of a sports card maker, the sports card maker can provide a description of the card, such as the team name and mascot, a player's name, the type of card (rookie card, achievement, etc.), and the like. In some embodiments, the requestor can provide a proposed or target creation date for the document, or can provide the creation date when the document was created. A request to generate the document may accompany a document purchase. The document information can include a date and/or an amount of the purchase, and an identity of the purchasing entity. In the example of FIG. 2, the document information can include the title "Collectible Card", the date of purchase, "01/01/2017," and the owner "Ronald."

In some embodiments, where the document is being requested by an entity other than the entity that has, makes, or produces the physical version of the document, the requestor can provide a requestor identity, or a current owner information. For example, in the case of a vital record, the vital records bureau may be the requestor using the document creation application, the vital record may have been requested by another entity, such as an individual listed in the vital record (marriage certificate, birth certificate, social security card, etc.) In this case, the vital records bureau can include the name, date, etc. of the entity requesting the document.

The document information provided to the document creation application can also include an identifier for a delivery point for the document. For example, if a person is requesting a birth certificate from a vital records bureau, or a sports card from a sports card maker, the requestor can provide the name, address, and date of the person requesting the vital record or the sports card. The composed documented records are government records that include vital information in association with personal identification information, encoded and encrypted to protect data, such as Social Security Numbers, Data of Birth/Birth Certificates, etc.

The process 300 moves to step 306, wherein the document creation application generates secure document information. The secure document information can include the mark 106, the serial number 107, the invisible code 108, the computer readable code 109, or any number or combination of these. The mark 106, the serial number 107, the invisible code 108, and the computer readable code 109 are generated based on the information provided by the requestor. The mark 106 can be a standard mark that is applied to all documents using the security system described herein, or can be tailored or customized for each individual requestor. For example, a sports card maker can have one unique mark 106 that identifies the maker and that the document has authentication and security features; and the vital records bureau can have another different, unique mark 106 that identifies the vital records bureau and the use of the security features described herein. The mark 106 need not specifically reference the security features, but may indicate to someone that security or authentication features are in use with regard to the document on which the mark 106 appears. In some embodiments, a requestor may have one or more lines of documents, such as types of sports cards, and a unique mark can be provided for each line of documents.

The serial number 107 can be a unique number associated with the requested document, and can be a sequential number, a randomly generated number, and the like. The serial number 107 corresponds to the document being requested.

The invisible code 108 is generated based on the EPM™ described herein. In some embodiments, the invisible code 108 is created by first creating a code associated with or pointing to the record or the document information in the memory or the database. This code is then encrypted using a secure algorithm to generate a computer readable code. The encrypted code becomes the invisible code 108 which is ultimately placed on the document. The invisible code 108 can encode the EPM™ or can encode information indicative of the EPM™. The invisible code 108 generated for the document can include or be associated with all or any combination of the document information provided. In order to access the document information or the document record, the invisible code 108 must first be read and/or decoded, then, the decoded code must be decrypted to obtain a code that is recognized by and can access the database where the document information is stored.

The computer readable code 109 can encode a delivery point, such as a 5 to 11 digit ZIP code, or other similar code if mailed outside the United States, corresponding to on the received delivery destination. In some embodiments, the computer readable code 109 encodes information related to the address or the delivery point to which the physical document being requested will be sent.

The document creation application can create a record in a memory or database for each document requested by the requestor. The generated secure document information, such as the mark 106, the serial number 107, the invisible code 108, and the computer readable code 109 can be associated with the record for the requested document, and the association can be stored in the memory or database with the record, or in a linked or related memory or database. The generated secure document information can be stored with cross-referenced associations such that the record for a document, can be identified through any one of the serial number 107, the invisible code 108, or the computer readable code 109, or such that any of the generated secure document information can be identified using any other of the generated secure document information.

The generated secure document information can be provided to the requestor via the user interface. For example, the document creation application can provide the mark 106, serial number 107, the invisible code 108, or the computer readable code which will printed using a specialized ink to become the invisible code 108, and the computer readable code 109. In some embodiments, the generated document information need not be communicated to the requestor, or that only some of the generated secure document information is transmitted to the requestor. For example, in some embodiments, only the serial number 107 or only the computer readable code 109 is provided to the requestor.

The process 300 moves to step 308, wherein the physical document is generated. The requestor can generate the physical document using at least a portion of the generated secure document information. In some embodiments, the requestor receives a confirmation that the physical document has been generated by the securing entity, for example, the USPS, or another entity. The physical document is generated by printing the document having the generated secure document information thereon, along with the contents of the document provided by the requestor or created by the requestor.

The process 300 moves to step 310, wherein the physical document is sent to a recipient. In some embodiments, the recipient can be the requestor. The securing entity can generate the document and send it to the requestor. For example, if a card manufacturer desires to produce secured sports cards in bulk, each having security and tracing features, the card manufacturer can request the securing entity to generate the physical cards and send those to the requestor, after which the requestor can distribute the cards.

In some embodiments, the requestor provides the secure document information, including the delivery point or intended destination for the document, as described herein. The securing entity generates the physical documents including an indicator of the delivery point, such as using the computer readable code 109. The securing entity can then induct or place the document in the distribution network, such as the mail stream, in the example of the USPS.

In some embodiments, the requestor generates the physical document itself using the provided secure document information. The requestor can include the computer readable code on the physical document. In some embodiments, the invisible code 108 and/or the computer readable code 109 can identify an account, or an entity having an account, and the computer readable code 109 can encode a postage amount or point to an association with an account for paying postage. For example, when the requestor desires to send the physical document to a recipient, the requestor places the physical document in the mail stream, the processing equipment scans the invisible code 108 and/or the computer readable code 109, and can identify a postage account to debit a postage payment. In some embodiments, the postage payment can be made at any point during process 300 and a postage payment can be associated with the record for the document.

The process 300 moves to step 310, wherein the document is tracked through the distribution system and the document record is updated. As the physical document moves thorough the distribution network, for example, the USPS mail stream, various components of processing equipment will scan the physical document, and will read any or all of the secure document information printed thereon. At each scan, the location, status, identifier for processing equipment on which the item was scanned, and any other desired tracking information is obtained and stored. For example, as the physical document moves through the mail stream, the mail processing equipment can scan the computer readable code 109 and/or the invisible code 108, and update the document record to reflect the location and status of the physical document, including induction, intermediate points, and final delivery of the physical document. In some embodiments, the physical document may be in a container, such as an envelope or box, in which the physical document is located. The container can have the computer readable code 109 thereon, or the container can have a different code thereon which is associated with the record for the document.

The process 300 moves to step 314, where the process 300 ends.

Figure 4:
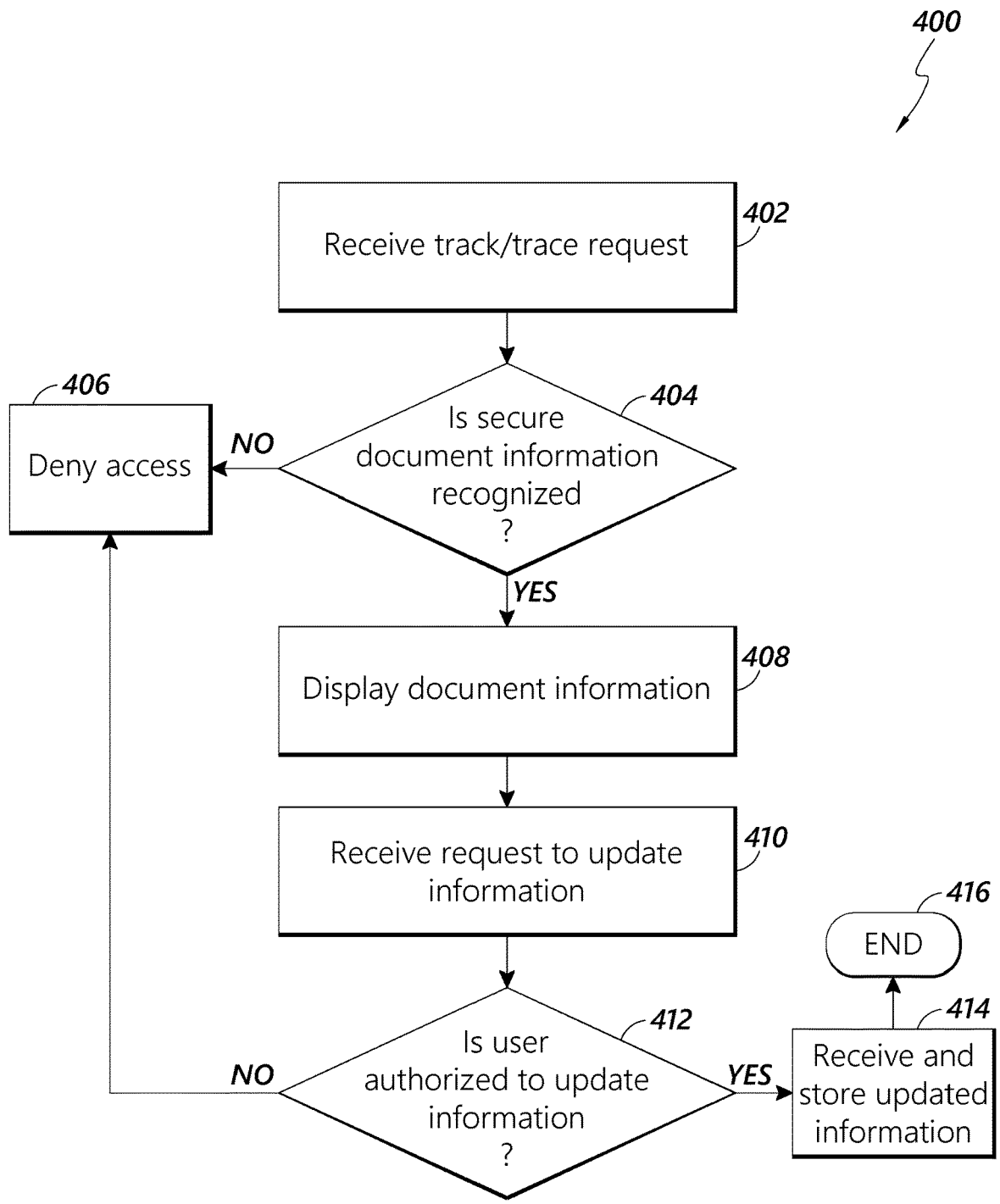
FIG. 4 is a flow chart depicting an embodiment of a process for viewing secure document information.

FIG. 4 is a flow chart depicting an embodiment of a process for accessing or viewing secure document information. A process 400 begins in step 402 wherein a secure document system receives a request for tracking or tracing a document. The request may come from a potential owner or buyer, or from a document recipient, or any other party, who is looking to see if the document is authentic, to determine its provenance, source, chain of title, and the like. In some embodiments, the request can come from an entity who is viewing a document provided by another entity as proof of identity, or to prove the contents of the document. For example, where a vital record or bank statement is being submitted to a government entity for issuing a government identification, or to a bank for a loan, to open an account, and the like, the government entity or the bank may wish to verify the authenticity of the document. The request can come in the form of a query via a website or mobile application, for example, where the serial number 107 is typed into a field in an application/website associated with the securing entity.

The request can come in the form of a scanner input, such as when the invisible code 108 is read using a scanner capable of reading the specialized ink with which the invisible code 108 is printed. This can be done, for example at a USPS facility, using a scanner able to emit the interrogation signals to illuminate and to read the invisible code 108. The scanner sends the scanned codes to a processor which can identify and/or decode the scanned codes.

After the serial number 107 is entered or the invisible code 108 is scanned, the process 400 moves to decision state 404, wherein it is determined whether the serial number 107 and/or the invisible code 108 is recognized. Recognizing the invisible code 108 can include decoding the invisible code 108, decrypting the decoded code, and comparing the decrypted code to the database for a corresponding or matching entry or document record.

If the serial number 107 or the invisible code 108 is not recognized in state 404, the process 400 moves to step 406, wherein the secure document system returns an error message or displays a message on the webpage, the mobile computing device, etc., that the serial number 107 or invisible code 108 were not recognized, and access is denied.

If the serial number 107 or the invisible code 108 are recognized in state 404, the process 400 moves to step 408, wherein the secure document information is displayed, for example, as described with regard to FIG. 2. A potential seller or buyer, or recipient who input a serial number into the application may see a screen similar to that shown in FIG. 2, which shows today's date, or the date of access, the title of the document, the date the document was created, purchased, or any other relevant date, the owner or originator of the document, and/or any other desired information. In some embodiments, the securing entity can also display a chain of title or ownership of the document.

Where the request for the secure document information or tracking or tracing comes from a scan of the invisible code 108, some or all the information included with the invisible code 108, such as the information contained within or wrapped with the EPM™ is available to the requesting entity. To read the EPM™, the scanner must have not only the capability to read the "invisible ink", but must be connected to a computer system having the correct encryption/decryption algorithm to decrypt the read code from the invisible code 108. When the invisible code 108 is read and decrypted, the document information and secure document information can be accessed. The information can include when the document was created, when it was modified, the scan history of the EPM™, tracking information, and any other desired information can be obtained.

The requesting entity can see the information to determine whether the document is owned by the seller of the document, to discover the document's provenance, or to determine whether the document was authentic. If the serial number is recognized, this can be evidence that the document is authentic. If the serial number is not recognized, this indicates that the document is not authentic. If the information associated with the document provided by the securing entity does not match what a potential seller, buyer, government officer, bank employee, etc. is not what is expected, this can be evidence that the document is not authentic.

In some embodiments, the process 400 may end following step 408. For example, if a user desires only to check a document's authenticity, the process can end after step 408. In some embodiments, a user may desire to update the information associated with the document, such as updating a purchase date, changing an owner, and the like. The tracking and tracing system can include features and functions to allow document information to be updated. If so, the process 400 moves to step 410, wherein a request to update the document information is received via a user interface.

The process 400 moves to decision state 412, wherein it is determined whether the user requesting to update the document information is authorized to update the document information. A user may have only privileges to view the document information. For example, where a user types the serial number into a website, the user will not be allowed to modify or update the document information. In this case, there may not even be a login required. If the user is not authorized to update or modify document information, the process moves to block 406, wherein access is denied to modify the document information.

In the case of a scan at a post office, where the securing system identifies a postal scanner as reading the invisible code 108, the securing system may allow the clerk at the post office to modify the document information. In some embodiments, the maker of the sports card may be authorized to modify document information. The card maker or vital records bureau may use the same access credentials as were used to provide the document information to the securing entity to get access to modify the document information. If the user is authorized to modify the document information, the process 400 moves to step 414, wherein the modified document information is received and stored. Then, when a user next accesses the document information, the modified or updated information will be displayed. In some embodiments, a record of the modification and the user making the modification will be recorded, stored, and will be available to view. In some embodiments, access to modify the document information may be granted when the invisible code 108, such as the EPM™ is successfully read and decrypted. In this case, only a user with access to decrypt the EPM™ are authorized to modify or change document information.

The process 400 then moves to step 416, wherein the process 400 ends.

Figure 5:
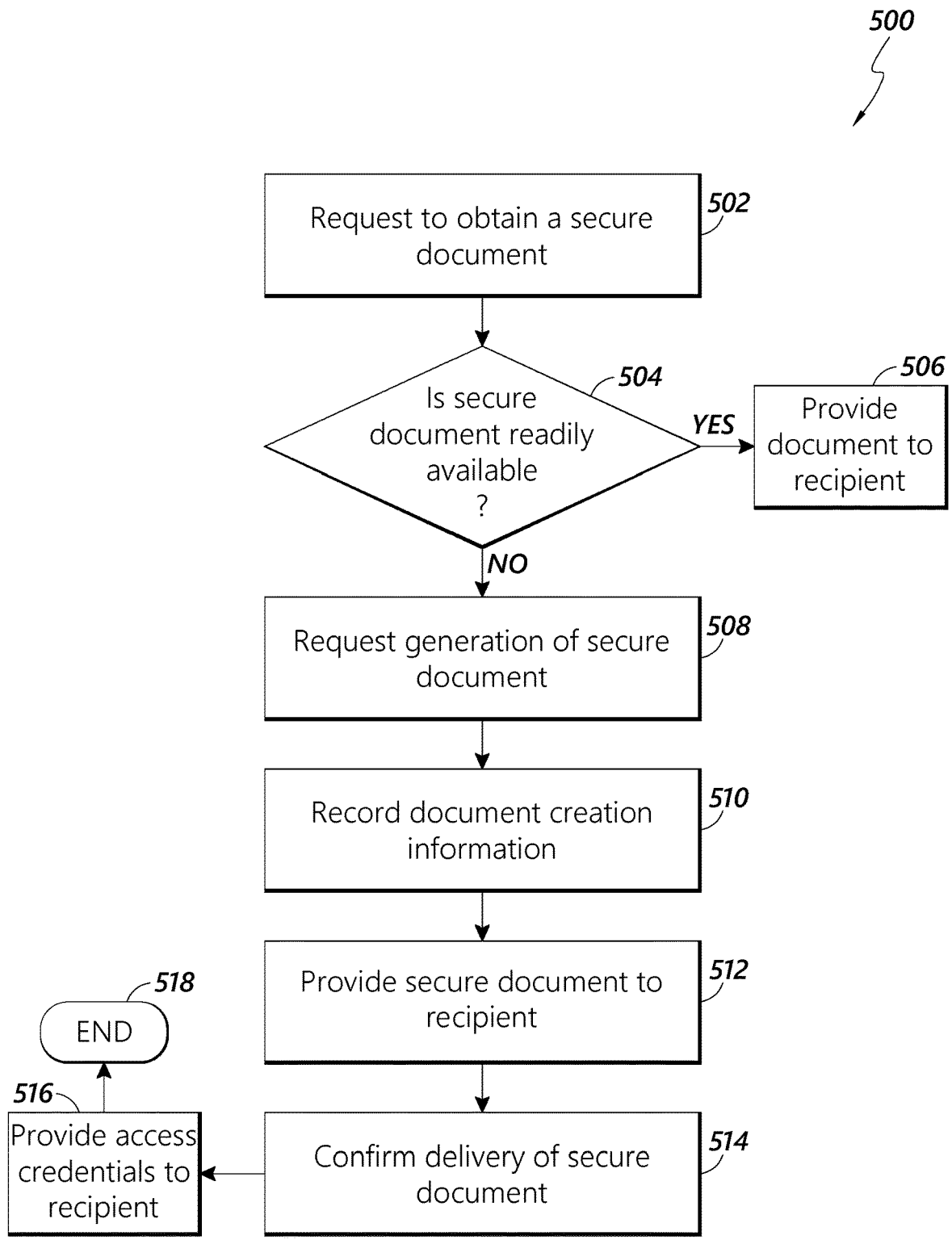
FIG. 5 is a flow chart depicting an exemplary process of ordering a secure document via a securing entity.

FIG. 5 depicts an exemplary process of ordering a secure document via a securing entity. A process 500 begins in step 502, wherein an entity, such as a user, a business, and the like requests to obtain a secure document. This request can come in the form of a customer browsing at a store, such as at a collectible card shop. The request can come in the form of an online request or purchase made over the internet. The request can be received at an automated kiosk, such as at an automated post center.

The process 500 proceeds to decision state 504, wherein it is determined whether a secure document such as the type being requested is readily available. In the case where the secure documents are collectible sports cards, secure documents may already have been printed, and may be available for purchase at a store.

If it is determined in state 504 that the document, or type of document being requested is readily available, the process 500 moves to step 506, wherein the secure document is provided to the customer. For example, the collectible card can be given to the purchaser in the store. In some embodiments, the secure document can be considered readily available, even if it is not on hand in a store's inventory. For instance, where the request for the secure document is made online, the secure document can be provided to the recipient by sending it via a distribution network, such as the USPS. In some embodiments, the maker or seller of secure documents may have the secure document in an inventory, such as a warehouse, and the maker or seller will ship the secure document to the recipient. In some embodiments, the distribution network may maintain an inventory of secure documents it has generated. When the user requests the secure document, the request can be directly to the distribution network, or can be made to the seller of the document, who, in turn, requests the distribution network send the secure document to the recipient. In some embodiments, the computer readable code 109 on the document can be associated with a delivery point, such as a street address, for the requestor, and the document can be shipped to the delivery point without providing any additional information on the document. The distribution network's processing equipment can be configured to scan and read the computer readable code 109 and sort and process the document accordingly. This can be done where the delivery point is coded into the computer readable code 109, or where the delivery point is associated with the computer readable code 109.

If it is determined in state 504 that the document is not readily available, the process moves to step 508, wherein generation of the secure document is requested. For example, if the document is a vital record, health records, a financial statement, or other similar document, the secure document may not already exist, and will need to be need to be created upon request. The process of requesting generation of the secure document can be similar to that described with regard to FIG. 3.

The process 500 moves to step 510, wherein the document creation information is recorded and stored. The document creation information recorded and stored can include the name and address of the purchaser or requestor, the date of purchase or request, creation date, creation time, creation location, or any other desired information related to the purchaser or the creation of the secure document. A copy of the document creation information can be provided to the requestor or purchaser. The document creation information can be provided to the requestor or purchaser via the interface used to purchase the secure document, or can be electronically communicated, such as via email, SMS, and the like.

The process 500 moves to step 512 wherein the secure document is provided to the recipient or purchaser. As described elsewhere herein, this can include the distribution network shipping the secure document to the recipient. In some embodiments, the maker, originator, or seller of the secure document can send or ship the secure document to the recipient, also as described elsewhere herein.

The process 500 moves to step 512 wherein delivery of the secure document is confirmed. When a delivery resource delivers the physical version of the secure document, the delivery resource may scan, using a mobile computing device, the computer readable code 109 on the secure document. This can occur as the document is placed in a mailbox, left in a post office box, an electronic parcel locker, on a doorstep, or in any other place where the recipient can receive. In some embodiments, the secure document may require an in-person delivery, or for the delivery resource to hand the secure document to the recipient, at which point the scan can occur. The mobile computing device can communicate the scan coinciding with the delivery event to the secure tracking and tracing system. The date, time, type, and location of the delivery event can be stored in the secure document record, or associated with the secure document in the memory or database. The delivery event can become part of the document information that is accessible through systems and methods described with regard to FIG. 4.

The process 500 moves to step 516, wherein the securing entity or another associated entity provides the recipient with access credentials, which allow the entity to view the document information via a computer portal. For example, where the secure document is a collectible sports card, the information can be readily available to any person who desires to view the document information, and can be done simply by entering the serial number 107 into a website. However, if the document information is more sensitive, such as a vital or health record, it may be undesirable to allow any entity to access the document information using the serial number 107. In this case, the securing entity can provide access credentials to access the tracking and tracing system which will allow a user to access only certain secure documents, for example, to access the secure document delivered to that recipient.

In some embodiments, the access credentials can be provided to the recipient via an email, SMS text message, in a separate physical document sent to the recipient, or as a token loaded onto the recipient's smartphone. In some embodiments, the recipient is notified that the recipient can access the document information by taking the document to a specific location having secure networks, such as to the post office or other location. There, upon providing appropriate identification, the postal clerk or other entity can scan the invisible code 108 and provide the document information to the recipient.

A person of skill in the art, guided by the present disclosure, will understand that step 516 can be performed at any time during process 500.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The present disclosure refers to processor-implemented steps for processing information in the system. Instructions can be implemented in software, firmware or hardware and include any type of programmed step undertaken by components of the system.

The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 210 may comprise a processor 212 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processors typically have conventional address lines, conventional data lines, and one or more conventional control lines.

The tracking and tracing system may be used in connection with various operating systems such as Linux®, UNIX®, MacOS®, or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Memory Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open"

terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for authenticating a document comprising:
    a memory storing document information, and a unique identifier and a code associated with the document information, the unique identifier encoding an intended delivery point;
    document processing equipment for receiving and processing a physical document, the document processing equipment comprising a scanner configured to scan the unique identifier and the code on a document being processed;
    a processor in communication with the document processing equipment, the scanner, and the memory, the processor configured to:
        read the scanned unique identifier to identify the intended delivery point for the physical document;
        decode the scanned code;
        query the memory using the decoded scanned code to obtain document information; and
        update the document information based on the identification of the intended delivery point and the decoding of the scanned code.

2. The system of claim 1, wherein the code is invisible to an unaided human eye.

3. The system of claim 2, wherein the scanner is configured to interrogate the code with a signal that causes the invisible code to become visible.

4. The system of claim 2, wherein the document processing equipment is configured to identify an emblem located on the physical document being processed.

5. The system of claim 4, wherein the code processor is further configured to receive and recognize the emblem, and, in response to recognizing the emblem, cause the scanner to emit an interrogation signal to read the invisible code.

6. The system of claim 1 wherein the unique identifier is an alphanumeric string.

7. The system of claim 1, wherein the processor is further configured to receive the unique identifier from a user interface and to cause the user interface to display the document information associated with the unique identifier.

8. The system of claim 7, wherein the scanner is further configured to read a computer readable code on the document being processed, the computer readable code corresponding to the unique identifier.

9. The system of claim 8, wherein the user interface is further configured to scan the computer readable code on the document and communicate the corresponding unique identifier to the processor.

10. The method of claim 1 further comprising receiving, via a user interface, the unique identifier.

11. The system of claim 10, further comprising receiving, by a processor the unique identifier from the user interface, and causing the user interface to display the document information associated with the unique identifier.

12. The system of claim 11, wherein the document further comprises a computer readable code on the document being processed, the computer readable code corresponding to the unique identifier.

13. The system of claim 12, further comprising scanning, by the user interface the computer readable code on the document and obtaining the document information associated with the unique identifier based on the scanned computer readable code.

14. A method of document validation comprising:
- storing, in a memory, document information, and a unique identifier and a code associated with the document information, the unique identifier encoding an intended delivery point;
- receiving, in document processing equipment, a document having the unique identifier and the code thereon;
- scanning the document to identify the unique identifier and the code on the document;
- reading, by a processor, the scanned unique identifier to identify the intended delivery point for the document;
- decoding, by a processor, the scanned code;
- querying, by a processor, the memory using the decoded scanned code to obtain the document information associated with the unique identifier and the code; and
- updating the document information based on the identification of the intended delivery point and the decoding of the scanned code.

15. The method of claim 14, wherein the code is invisible to an unaided human eye.

16. The method of claim 15, wherein scanning the code comprises interrogating the code with a signal that causes the invisible code to become visible.

17. The method of claim 15, wherein the received document further comprises an emblem on the document, and wherein scanning the document further comprises scanning the document to identify the emblem.

18. The method of claim 17, further comprising recognizing, by a processor, the emblem, and, in response to recognizing the emblem, causing the scanner to emit an interrogation signal to read the invisible code.

19. The method of claim 14, wherein the unique identifier is an alphanumeric string.

20. A system for authenticating a document comprising:
- a memory storing document information, and a unique identifier and a code associated with the document information;
- document processing equipment for receiving and processing a physical document, the document processing equipment comprising a scanner configured to scan the unique identifier and the code on a document being processed;
- a processor in communication with the document processing equipment, the scanner, and the memory, the processor configured to:
- read the scanned unique identifier;
- recognize an emblem on the physical document being processed;
- in response to recognizing the emblem, causing the scanner to emit an interrogation signal to read the code on the physical document;
- decode the scanned code;
- query the memory using at least one of the scanned unique identifier and the decoded scanned code to obtain document information; and
- cause the document information to be displayed.

* * * * *